United States Patent
Ng et al.

(10) Patent No.: US 12,516,454 B2
(45) Date of Patent: Jan. 6, 2026

(54) KNIT FORMWORK CASTING

(71) Applicant: The Regents of the University of Michigan, Ann Arbor, MI (US)

(72) Inventors: Tsz Yan Ng, Ann Arbor, MI (US); Sean Ahlquist, Ann Arbor, MI (US); Evgueni T. Filipov, Ann Arbor, MI (US); Tracey Weisman, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 154 days.

(21) Appl. No.: 18/033,396

(22) PCT Filed: Oct. 22, 2021

(86) PCT No.: PCT/US2021/056179
§ 371 (c)(1),
(2) Date: Apr. 24, 2023

(87) PCT Pub. No.: WO2022/087359
PCT Pub. Date: Apr. 28, 2022

(65) Prior Publication Data
US 2023/0399777 A1 Dec. 14, 2023

Related U.S. Application Data

(60) Provisional application No. 63/104,309, filed on Oct. 22, 2020.

(51) Int. Cl.
*D04B 1/22* (2006.01)
*D04B 15/66* (2006.01)

(52) U.S. Cl.
CPC .............. *D04B 15/66* (2013.01); *D04B 1/22* (2013.01); *D10B 2505/20* (2013.01)

(58) Field of Classification Search
None
See application file for complete search history.

(56) References Cited

U.S. PATENT DOCUMENTS

| | | | |
|---|---|---|---|
| 2016/0075061 A1* | 3/2016 | Waas | D06M 15/564 264/231 |
| 2017/0080599 A1* | 3/2017 | Yun | B28C 5/06 |
| 2019/0344477 A1 | 11/2019 | Huffa et al. | |

FOREIGN PATENT DOCUMENTS

| WO | 2016144971 A1 | 9/2016 |
|---|---|---|
| WO | 2018129521 A2 | 7/2018 |

OTHER PUBLICATIONS

Popescu, Mariana Adriana: "KnitCrete", Diss. ETH No. 26063, Doctor of Science of ETH Zurich Thesis, pp. 1-246, XP093185966, 2019 (Retrieved from https://www.research-collection.ethz.ch/handle/20.500.11850/408640), (Year: 2019).*

(Continued)

*Primary Examiner* — Mohammad M Ameen
(74) *Attorney, Agent, or Firm* — Lempia Summerfield Katz LLC

(57) ABSTRACT

A method of material casting includes knitting, by a computer-controlled knitting machine, a flexible formwork, where the flexible formwork defines a partially-closed shape having a plurality of topological features, filling the flexible formwork with a casting material, and deforming the flexible formwork with the casting material. In some cases, the method includes removing the casting material from the flexible formwork when the flexible formwork has imparted the shape on the casting material.

20 Claims, 13 Drawing Sheets

(56) References Cited

OTHER PUBLICATIONS

International Preliminary Report on Patentability from International Patent Application No. PCT/US2021/056179, dated Apr. 13, 2023, 4 pages.
International Search Report and Written Opinion of the International Searching Authority from International Patent Application No. PCT/US2021/056179, dated Jan. 26, 2022, 5 pages.
Ahlquist, S., McGee, W. & Sharmin, S. Nov. 2017. "Pneumaknit: Actuated Architectures Through Wale- and Course-Wise Tubular Knit-Constrained Pneumatic Systems." In T. Nagakura & S. Tibbits (eds.), Acadia 2017: Disciplines & Disruptions, Proceedings of the 37th Annual Conference of the Association for Computer Aided Design in Architecture (ACADIA), Boston. 39-51.
Ahlquist, S.. Sep. 2015. "Integrating Differentiated Knit Logics and Pre-Stress in Textile Hybrid Structures." In Thomsen, M., Tamke, M., Gengnagel, C., Faircloth, B., and Scheurer, F. (eds.) Modelling Behaviour: Proceeding of the Design Modelling Symposium, Copenhagen, 1-14.
Extended European Search Report from European Patent Application No. 21883953, dated Aug. 27, 2024, 7 pages.
Ng et al., "Active-Casting", Acadia 2020, pp. 546-555.
Patel et al., "Kneu-crete: CNC Knits for Programmable Hybrid Formwork", Acadia 2019, Ubiquity and Autonomy, Projects Catalog of the 39th Annual Conference of the Association for Computer Aided Design in Architecture, pp. 74-79, 2019.
Popescu, Mariana, Matthias Rippmann, Tom Van Mele, Philippe Block. 2020. "KnitCandela, Challenging the Construction, Logistics, Waste and Economy of Concrete-Shell Formworks." In Fabricate 2020, edited Burry, J., Sabin J., Sheil, B., and Skavara, M. London: UCL, 194-201.
Veenendaal, Diederik, Mark West, Philippe Block. 2011. "History and overview of fabric formwork: using fabrics for concrete casting." Structural Concrete 12 (3), 164-177.
West, Mark, 2016. The Fabric Formwork Book: Methods for building new architectural and structural forms in concrete. London: Routledge; pp. 147-148.

* cited by examiner

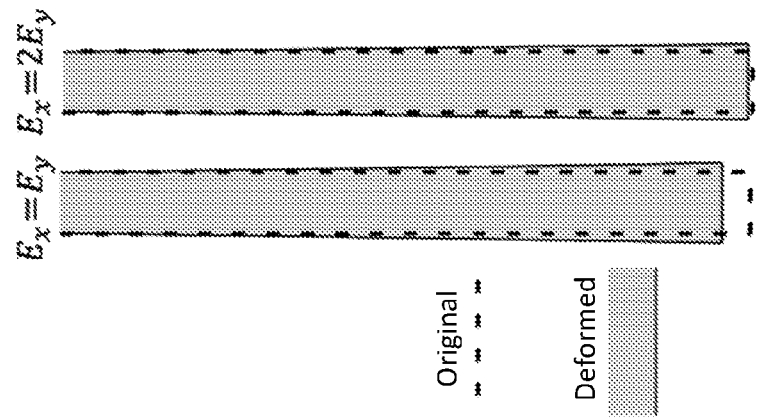
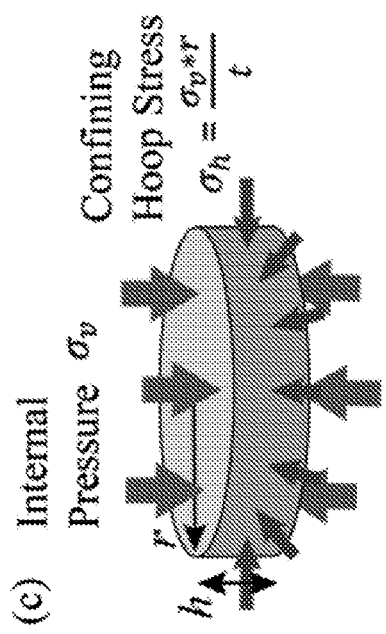
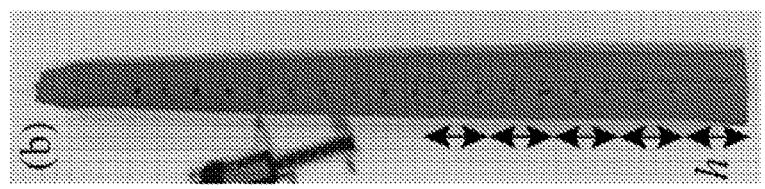
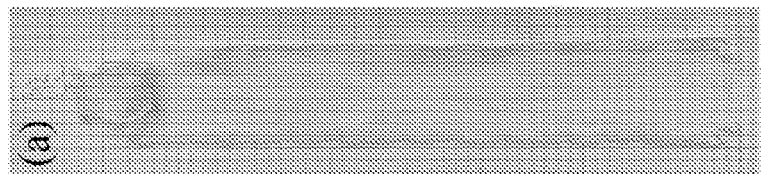
FIG. 9a  FIG. 9b  FIG. 9c  FIG. 9d  FIG. 9e

KNIT FORMWORK CASTING

CROSS-REFERENCE TO RELATED APPLICATION

This U.S. National Phase application is based on International Application No. PCT/US2021/056179, filed Oct. 22, 2021, which claims the benefit of U.S. provisional application entitled "Knit Formwork Casting," filed Oct. 22, 2020, and assigned Ser. No. 63/104,309, the entire disclosures of which are hereby expressly incorporated by reference. Priority benefit of these earlier filed applications is hereby claimed.

BACKGROUND OF THE DISCLOSURE

Field of the Disclosure

The disclosure relates generally to using Computer Numeric Controlled (CNC) manufactured knitted formwork to cast objects.

Brief Description of Related Technology

Textile or fabric concrete casting has been explored by numerous designers and research groups. A common technique utilizes mass manufactured textiles that are patterned, assembled by sewing, or serged to create the overall formwork. These textiles are commonly using woven materials. Fabric casting may be used for form-finding possibilities as the soft textile drapes or reacts to the weight and hydrostatic pressure of the concrete. In such fabric casting, the formwork is treated as a bag or as an open face surface for sprayed glass-fiber reinforced concrete (GFRC) with only one finished surface.

SUMMARY OF THE DISCLOSURE

In accordance with one aspect of the disclosure, a method of material casting includes knitting, by a computer-controlled knitting machine, a flexible formwork, where the flexible formwork defines a partially-closed shape having a plurality of topological features. The method further includes filling the flexible formwork with a casting material and deforming the flexible formwork with the casting material.

In connection with any one of the aforementioned aspects, the devices and/or methods described herein may alternatively or additionally include or involve any combination of one or more of the following aspects or features.

In one aspect, a topological feature of the plurality of topological features includes a pocket.

In one aspect, a topological feature of the plurality of topological features includes a tether between surfaces of the flexible formwork pouch.

In one aspect, a topological feature of the plurality of topological features includes an aperture.

In one aspect, the method includes inserting a casting reinforcement member into the flexible formwork before filling the flexible formwork.

In one aspect, the flexible formwork has a first conformation and a second conformation different from the first conformation, the flexible formwork in the second conformation defines the shape, and filling the flexible formwork with the casting material deforms the flexible formwork from the first conformation to the second conformation.

In one aspect, the method includes determining the first conformation of the flexible formwork based on the shape and the texture of the second conformation prior to filling the flexible formwork with the casting material.

In one aspect, determining the first conformation of the flexible formwork is based on a physical property of the casting material.

In one aspect, the physical property is a rheological property.

In one aspect, the flexible formwork comprises a pocket for a rigid support separate from the casting material.

In one aspect, the method includes inserting the rigid support into the pocket.

In one aspect, the flexible formwork is knitted from a plurality of yarns, a first yarn of the plurality of yarns is composed of polyester, nylon, spandex, or a combination thereof, and a second yarn of the plurality of yarns is composed of polyester, nylon, spandex, or a combination thereof, different from the first yarn, In one aspect, the flexible formwork includes a wall and a tether, the wall comprises the first yarn, and the tether comprises the second yarn.

In one aspect, the casting material is glass fiber reinforced concrete (GFRC).

In one aspect, the method includes removing the casting material from the flexible formwork when the flexible formwork has imparted the shape on the casting material.

In one aspect, the flexible formwork defines a texture.

BRIEF DESCRIPTION OF THE DRAWING FIGURES

For a more complete understanding of the disclosure, reference should be made to the following detailed description and accompanying drawing figures, in which like reference numerals identify like elements in the figures.

FIG. 9a depicts a knit formwork in accordance with one example.

FIG. 9b depicts a cylindrical casting made with the knit formwork of FIG. 9a in accordance with one example.

FIG. 9c is a model of a slab of the cast cylinder with a vertical internal pressure due to a weight of the casting material and a hoop stress on the casting due to the knit formwork in accordance with one example.

FIG. 9d is a matrix representing the anisotropic stresses to strains within the knit formwork in accordance with one example.

FIG. 9e is a model of the stretching of the knit formwork due to the weight of the casting material in accordance with one example.

Figure 1A:
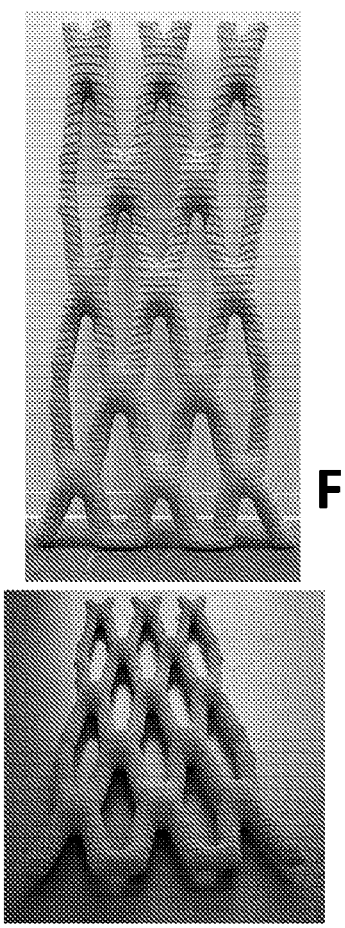
FIG. 1a depicts a diagrid formwork in accordance with one example.
Figure 1B:
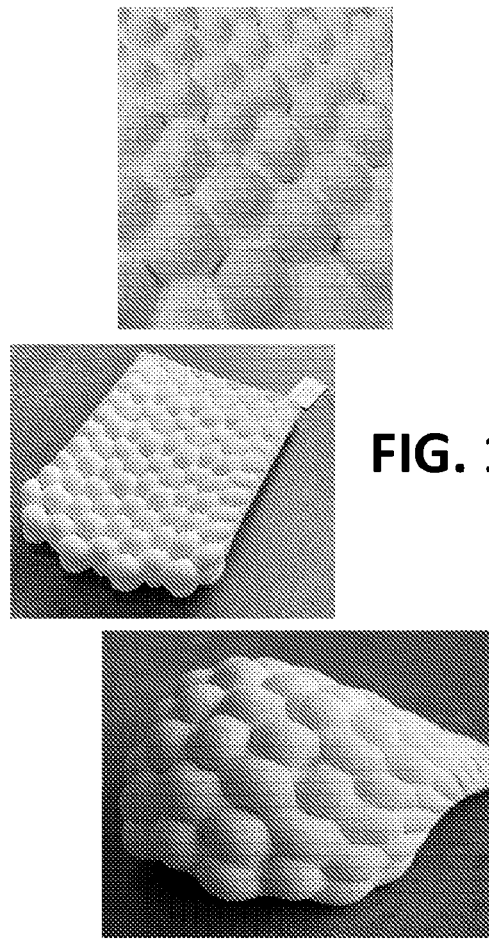
FIG. 1b depicts a drupelet typology in accordance with one example.
Figure 1C:
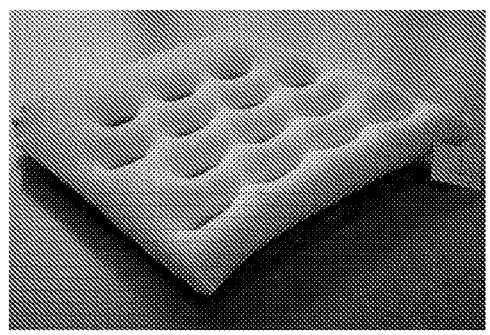
FIG. 1c depicts a panel aperture typology in accordance with one example.
Figure 1D:
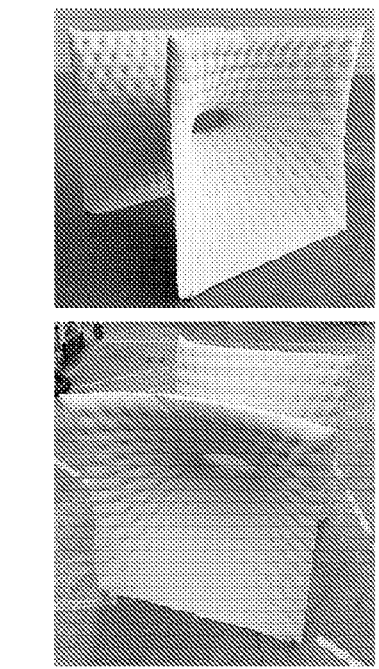
FIG. 1d depicts a 3D funnel shell typology in accordance with one example.

The embodiments of the disclosed formworks, systems, and methods may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

CNC knits as formwork for casting concrete is a novel method to generate complex geometry for concrete casting. Concrete casting for complex geometry is labor and material intensive, making it costly for typical construction. The method devised enables ease of concrete construction, deployable anywhere given the lightweight quality of the formwork, and will cost less given the automation to the formwork manufacturing. The devised technique is not common since CNC knitting is mostly associated with product and fashion design. Since CNC knitting has entered architectural production through advances in digital fabrication and computational design, coupled with advances in concrete innovation, the disclosed method for casting concrete brings these otherwise distinct disciplines together.

CNC knits may be employed over other types of textile since customization for shape and 3-dimensionality is possible without the requirement for patterning, cutting and sewing. Thus far, customized CNC knits as formwork have been used as open face formwork for GFRC spray casting for thin-shell hypars or vault typologies with coffer-shaped surface treatment. This involves a stretcher to pull the textile taunt with enough resisting force to counter the weight of the concrete. When the knitted formwork is not an open face formwork, but used for volumetric casting, the knit is imbibed with a stiffening agent after being stretched to the intended form to create a hard mold for casting. These instances typically have a pre-determined stretched form with minimal change after casting, producing literally a negative of the stretch formwork.

The disclosed formworks and techniques deviate from these precedents. The techniques and formworks of the present disclosure employs the dynamic interaction of casting where weight and hydrostatic pressure of the fresh concrete is restrained by a customized 3D-knitted formwork. The final cast volume is not a direct negative of the knitted formwork, but rather, the cast is uniquely shaped, derived from the behavior of the knit in direct interaction with the concrete's rheological properties as a poured volume.

The disclosed formworks are not imbibed with a hardening agent or otherwise stiffened. For instance, the disclosed formworks are not configured as an open-face formwork with pre-determined stretched form for concrete spraying. Instead, the disclosed formworks and methods utilize the dynamic interaction of casting where weight and hydrostatic pressure of the fresh concrete is restrained by a customized 3D-knitted formwork.

One useful aspect of the CNC knitted formworks of the disclosed methods reduces the amount of construction waste for typical concrete formwork production compared to traditional methods of using stock construction materials or prefabricated formwork. Automation with CNC knitting reduces labor and time for formwork production and affords complex geometries difficult to accomplish with tradition casting methods. The soft knitted formwork is also lightweight and easily transportable to where casting will take place.

Bespoke Computer Numeric Controlled (CNC) manufactured knits may be used to produce volumetric textile formwork for casting glass fiber reinforced concrete (GFRC). The disclosed methods may utilize multi-material, functionally-graded knit formwork as a fully seamless system to cast concrete. Working with controlled characteristics such as elasticity and stiffness of yarn type and knit structure, the soft textile is the vessel that defines the performative characteristics of volume, geometry and surface detail. With only a minimal frame to suspend the volumetric cast, hydro-static pressure "inflates" the fabric formwork creating a dynamic form-finding process that eliminates the need for typical molding materials such as wood or foam. Unlike an open-face, GFRC sprayed system, the flexible knit formwork of the disclosed methods produces a finished surface on all faces, embedded with expressions in form and surface detail from the knitted formwork. The precast units using this process reduce the amount of construction waste for formwork production, proposes a more automated fashion for manufacturing the formwork, and produces casts with complex geometries difficult to accomplish with traditional casting methods.

Custom Computer Number Controlled (CNC) manufactured knits have tailored performance properties through the specification of yarn type, yarn combinations and knit structure. The technology is most commonly used in the fashion industry and also for "technical textiles" for office furniture, such as in high-end desk chairs. The capacities of both these industries may be combined—the form, multi-materiality and tailoring from the fashion industry, and the high-performance structural qualities from "technical" knitting—and applied uniquely to larger scales that are relevant to architectural applications.

Yarn specifications includes elastane, polyester, aramid, monofilament, and metallic yarn. Both knit structure and integration of multiple yarn materials within a single knit are utilized to produce textiles with unique levels of multi-axial stretch and stiffness. Through these aspects of yarn type, stitch structure and multi-materiality, a single knitted textile is engineered to contain localized performance characteristics, commonly termed as functional-grading. Contemporary processes for CNC knits enable seamless 3-dimensionality, which eliminates post-processing efforts such as cutting and sewing.

As shown in FIG. 1, there are four formal typologies, (a) diagrid (approximately 7' high and 3' wide), (b) drupelet texture (each drupelet is approximately 1.75" wide), (c) apertures in panels, and 3-(d) 3D funnel shell (approximately a 2' cube), prototyped to leverage the logic of different combinations of knit types, yarns, and knit structures. In some cases, the typologies may take the form of non-load bearing panels and/or self-supporting funnel shells joined at the funnel end.

Figure 2C:
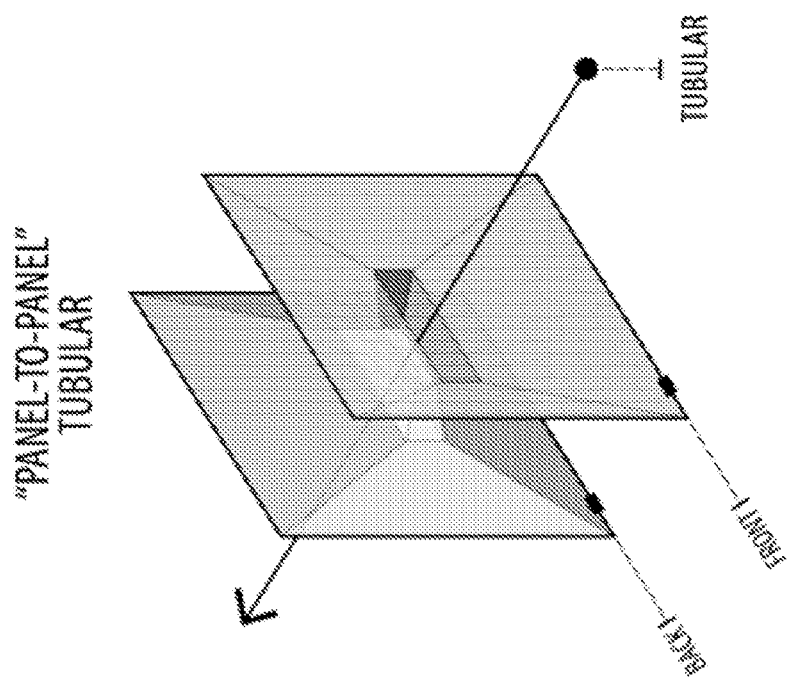
FIG. 2c depicts an aperture knit type with two panels in accordance with one example.
Figure 2B:
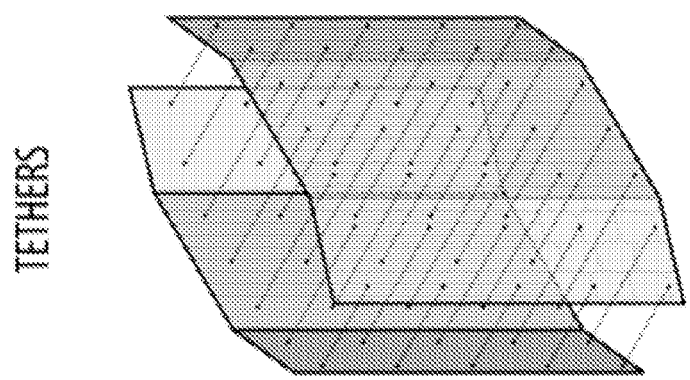
FIG. 2b depicts a double layer knit type with tethers interconnected between layers in accordance with one example.
Figure 2A:
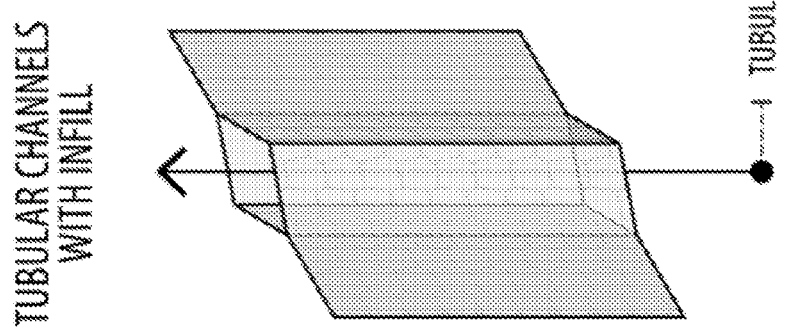
FIG. 2a depicts a tubular channel knit formwork with single layer infill in accordance with one example.

As shown in FIG. 2, the knit types are categorized as tubular pockets or channels (with infill between channels), double-layer knit with tethers, and tubular/apertures produced by double-layer knit with tubular interconnections, also known as a "panel-to-panel" tubular knit. Each of these are based upon common knitting methods, but advanced for the specific use of concrete formwork.

For example, the diagrid casts utilize continuous pockets that intersect. When the knit is removed after casting, the single-layer field between the tubular volumes produces apertures in the concrete cast. These were explored at different scales with the largest panel to be over 7 ft high produced from a multi-material knit that stretched about four times its original length and produced a deep undulating surface. The drupelet texture prototype involves constraining web of polyester with infill of nylastic yarn. The significant difference in stretch and stitch structure between the two patterns offers varying levels of restraint for the mold's surface, thus, creating the drupelets.

In a further example, the "tethers" technique is an advancement of the common "spacer fabric." The "spacer fabric" is often used in the seat back of a chair to generate both conformability and cushion, through adding many interconnections of yarn between the two layers of the knit. The density of the spacer knits produces the spring back quality after compression forces are applied. Thus, the density of the spacer yarn provides the resisting force for the textile. Using tethers greatly minimizes the number of interconnections between the two layers to improve the flow of concrete and the forces inflicted on the tether are tensile forces to resists the weight and hydrostatic pressure of the concrete. This pulling force of the tethers is what creates the dimple or tufted texture to the cast components. The "tethers" may be significantly longer than the interconnections of a spacer knit, so that the volume of space between the two layers may be maximized.

In another example, the 3D funnel shell explores two combined 3D tether-knits attached at the aperture to form a single monolithic cast with the shell thickness constrained by the tethered knits. Each of these typologies are explored at different scales, developing control and variations through refined casting processes and specific concrete mix design.

For the purpose of using CNC functionally-graded knits to create textile formwork for casting concrete, complex geometric forms are designed, through combinations of these three technique and integration of multiple yarn materials, to dynamically interact with the fresh concrete to produce the final form of the cast component. Depending on the knit structure and materiality, stitch patterns ultimately create textures become embossed into the cured concrete.

Figure 3B:
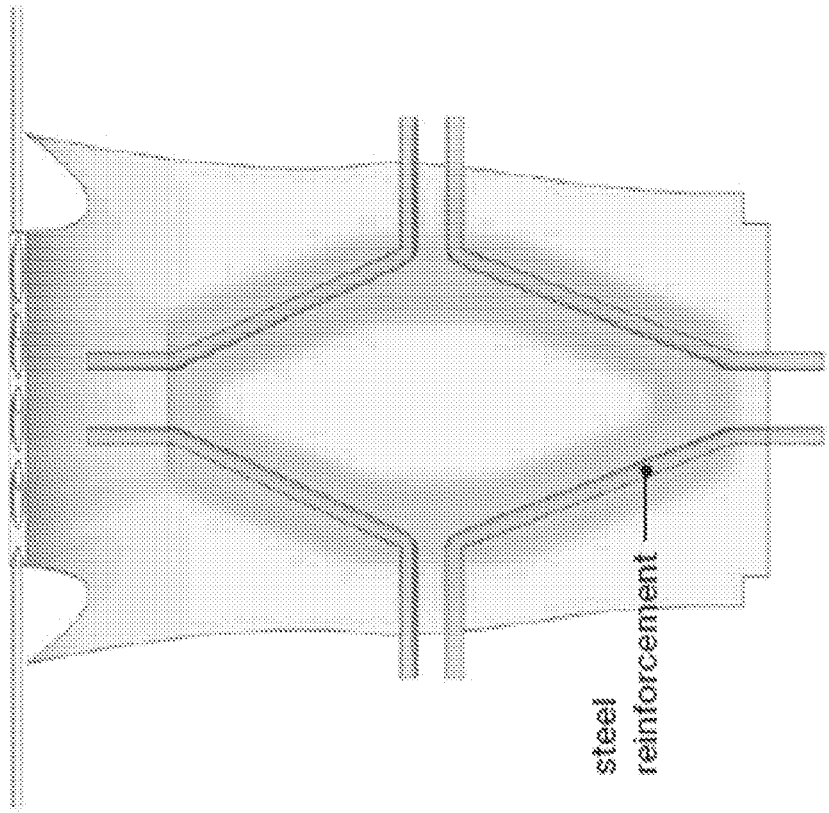
FIG. 3b depicts a sectional view inside the knit and concrete showing in accordance with one example.
Figure 3A:
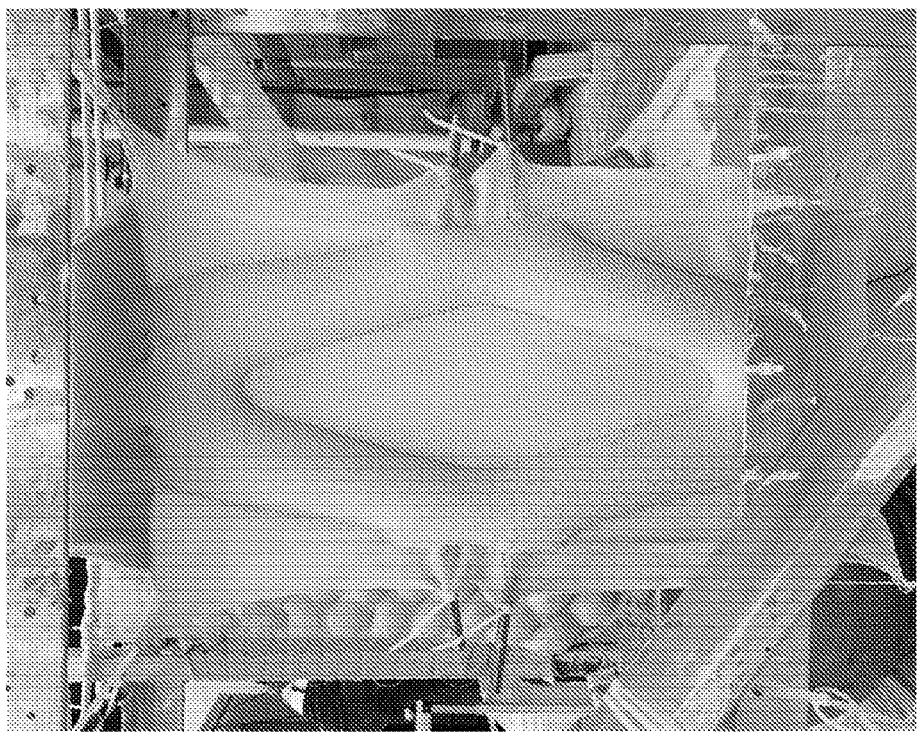
FIG. 3a depicts a diagrid panel cast with steel reinforcement in accordance with one example.

As shown in FIG. 3a, the non-load bearing panels of both diagrid and drupelet textures are designed to include steel reinforcement insertions (e.g. ⅜" steel reinforcement) from the sides for connecting details and with structural capacity. FIG. 3b shows the sectional view inside the knit where placement of reinforcements are located.

Figure 4C:
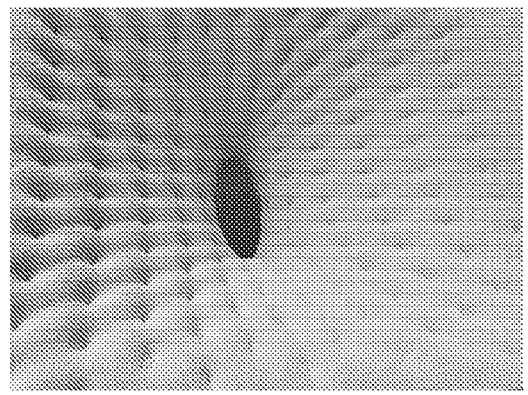
FIG. 4c depicts a tufted texture produced by a knit with tethers between two layers of knit in accordance with one example.
Figure 4B:
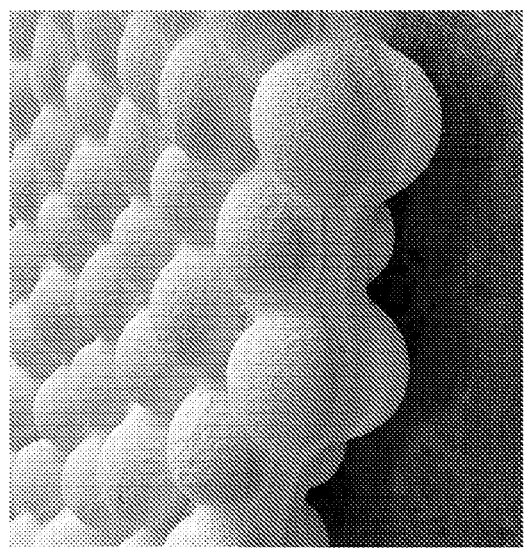
FIG. 4b depicts a drupelet texture produced by a knit with polyester web and nylastic fill in accordance with one example.
Figure 4A:
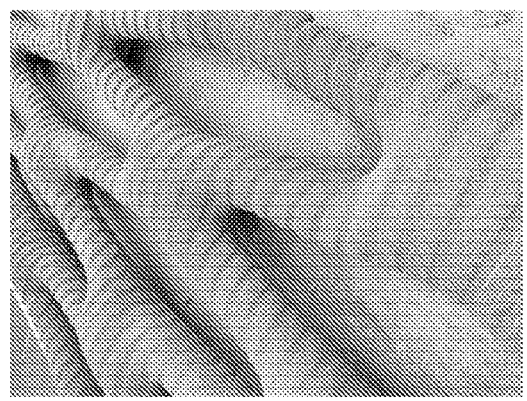
FIG. 4a depicts a texture produced by a ribbed knit with polyester and monofilament yarn in accordance with one example.

As shown in FIG. 4 (a-c), textures to the surface of the concrete, embedded by the knit are distinct to the knit structure of the formwork. This includes multi-material ribbed knits, a web of constraining yard with infills of different yarn and stitch types such as for the drupelet textures, and dimple or tufted textures using the tether approach as seen in the 3-dimensional funnel shells.

Figure 5:
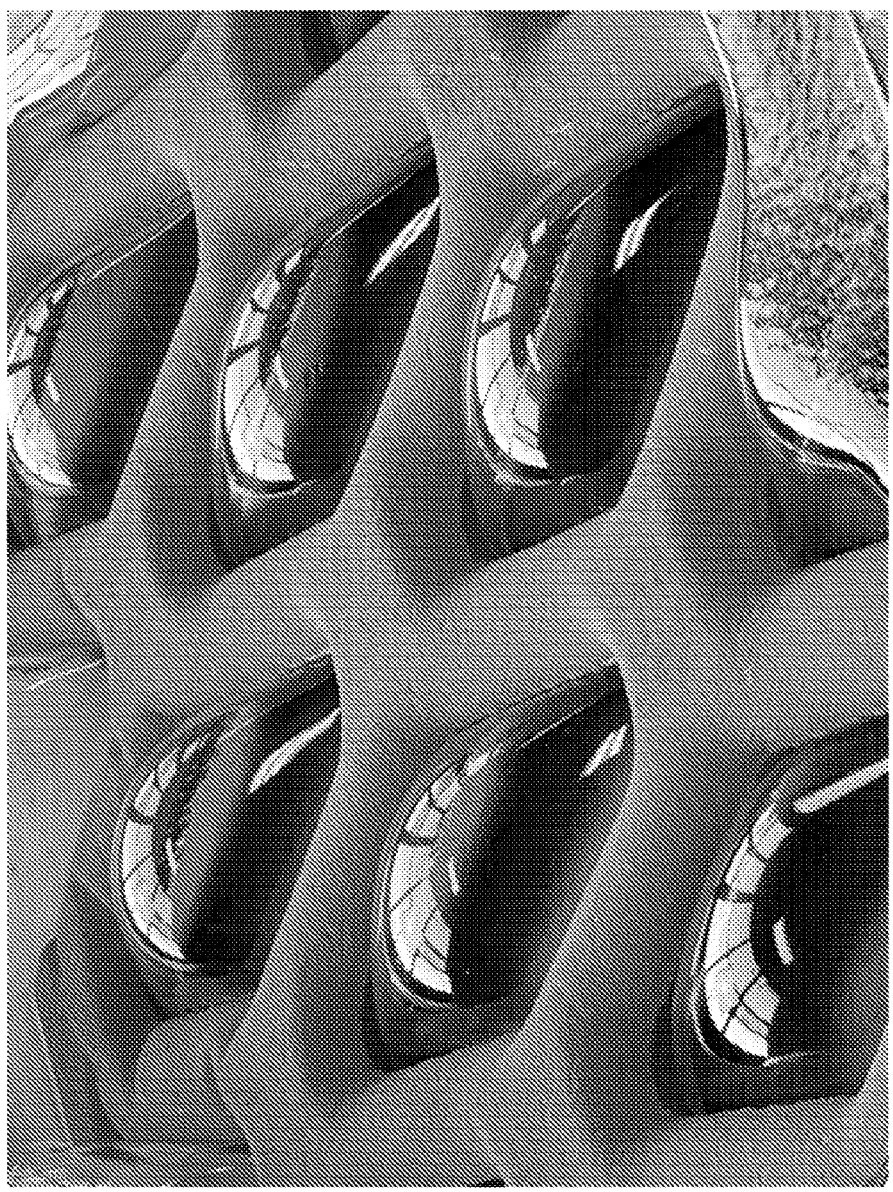
FIG. 5 depicts a diagrid panel with a vacuum-formed acrylic seat in accordance with one example.

Other combinations are possible. Through these formwork manufacturing approaches, there are numerous combinations that may produce a variety of building components, structural elements, and non-bearing components. When knitted formwork are combined, it may produce large-scale monolithic cast structures such as thin and thick-shell inhabitable structures. The cast concrete components may incorporate multi-material post production processes such as vacuum formed clear acrylic seal for panel systems (e.g. for diagrid panels), as seen in FIG. 5. This same process using slump glass is possible when the cement is replaced with refractory cement which may withstand typical glass kiln temperature.

Figure 6:
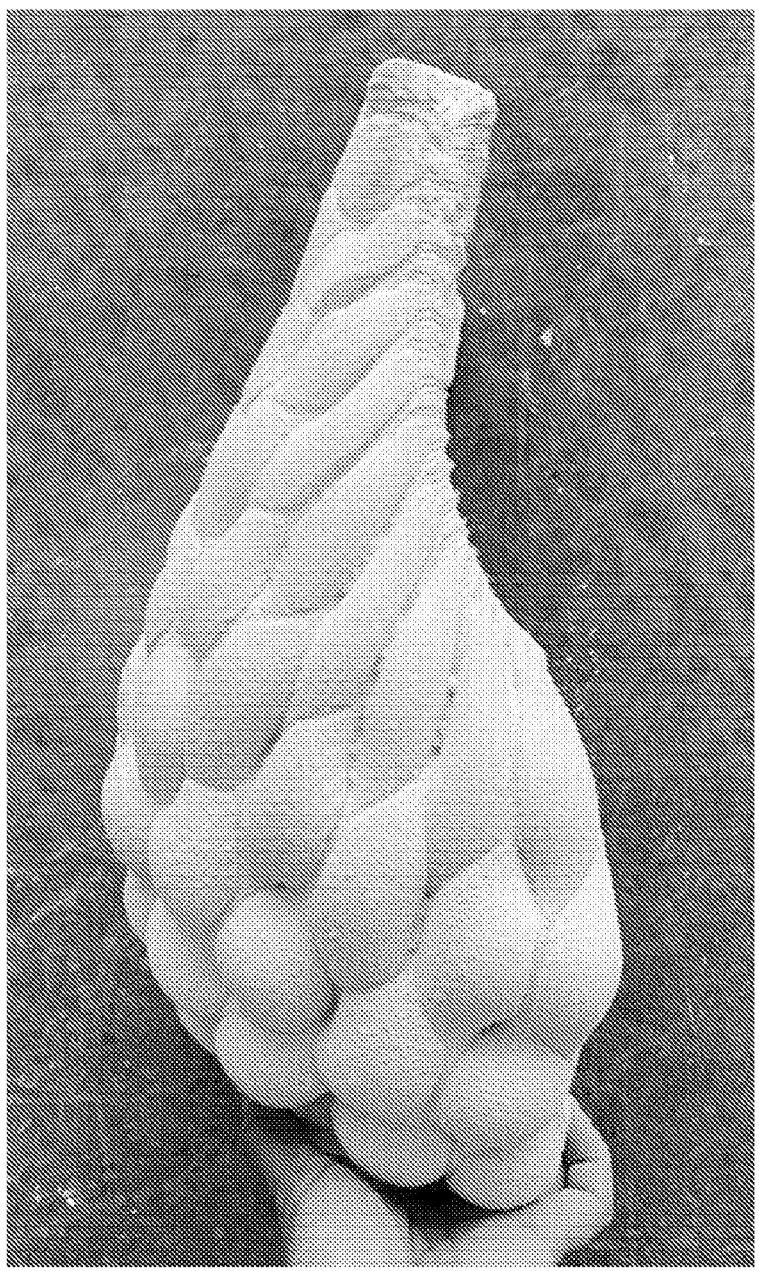
FIG. 6 depicts a casting with non-planar deformation from the weight and hydrostatic pressure of the concrete with a drupelet texture produced by a knit with tethers between the knit layers the side edges of the knit constrained to allow the surface to stretch beyond the length of the sides in accordance with one example.

As shown in FIG. 6, in cases when the knit formwork is strategically constrained, the deformation from gravity, self-weight, and hydrostatic pressure, may produce non-planar deformation with complex geometries.

GFRC may be used to balance strength in relation to mass. GFRC may also be used instead of steel reinforcement for complex formal geometries and large-scale components. The concrete matrix, with shear thinning behavior, is designed for flow to help with casting, but 'stiff' enough to prevent extensive seepage through the textile. Agitated motion to the formwork during the casting process is introduced to help the flow of the fresh concrete and reduce air trapped in the mix. In some cases, vibration immediately after casting is not necessary as trapped air bubbles escapes through the knit during filling. To ensure consistent hydration level for the concrete, the knit is saturated with water prior to casting, ensuring that the knit won't absorb the water content from the fresh concrete. If hydration process for concrete is affected, strength level will be reduced or even potentially causing micro-cracks.

The GFRC mix in combination with steel reinforcement has also been explored. In this case, openings at the edges of the knit formwork allow the steel to be inserted and held in position. Ultimately, standard concrete mixes may be used for casting with the steel reinforcement. To keep components light, less cementitious material and aggregates but having higher strength mixes with fiber reinforcement may be used. Post casting, the entire formwork is wrapped in plastic to maintain consistent levels of moisture for curing.

Figure 7:
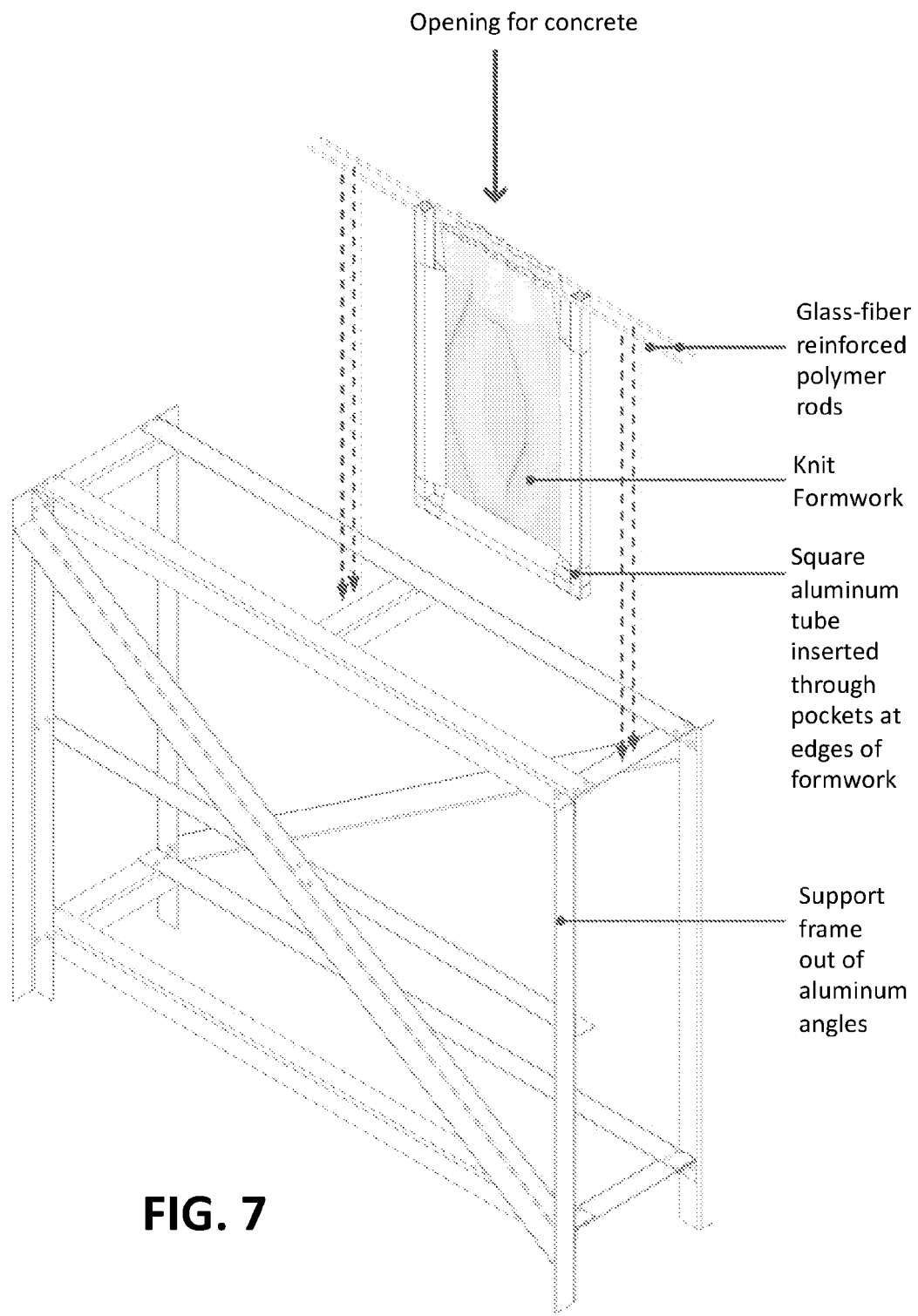
FIG. 7 depicts a setup for casting with a knit formwork in accordance with one example.

A reusable frame or scaffold as seen in FIG. 7, in this case out of aluminum 2"×2" angles, holds the prepared knit in place for casting. The connections for the members of the frame are not rigid, loosely bolted in place to allow for agitation motion, either by rocking the frame or tapped with a rubber mallet. The give of the frame allows for motion to the formwork during the casting process to help the concrete flow.

The top of the knit formwork has eyelets that allows glass-fiber reinforced polymer (GFRP) rods to alternately thread through. These two rods at the top serve multiple purposes. It keeps the top edge straight, are used to hang the formwork, with the ends of the GFRP rods resting on the scaffold, and create the opening for concrete casting. The side and bottom edges of the formwork has pre-knitted pockets to receive either GFRP rods or aluminum square sections (in this case 1"×1") to keep the edges straight depending on the scale of the component being cast. These edges are not held in place to enable the knit to stretch as the concrete fills the formwork. These straightening edges may be removed immediately after casting or after the concrete is cured during the demolding process. Zip-ties are used to support the hanging of the formwork accounting for the weight of the concrete.

Figure 8:
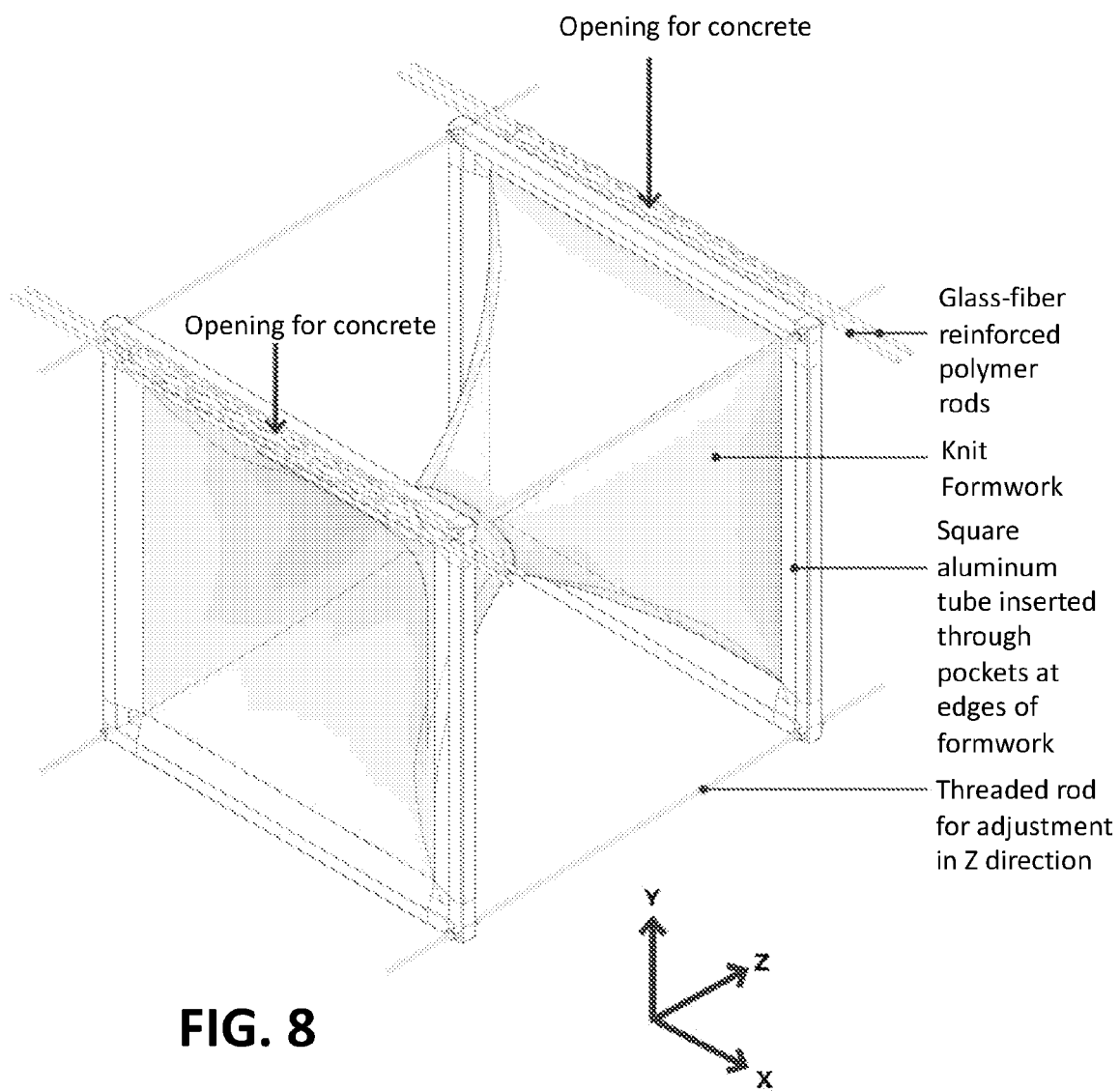
FIG. 8 depicts a setup for casting a 3D funnel shell with a knit formwork in accordance with one example.

As shown in FIG. 8, a reusable and adjustable three-dimensional stretcher is devised for the 3D funnel shell. The stretcher may be made of aluminum 1"×1" square tubes with two-way plastic right-angle connections, and the frame may have interchangeable lengths of tubes to adjust for the size of the formwork in the X and Y direction. An opposing frame is similarly created to stretch the opposing funnel formwork with threaded rods and bolts in between to adjust in the Z direction. Pockets are knitted at the edges of the larger end of the funnel, where the aluminum tubes slide through. One edge of the larger square end of both funnels receives two GFRP rods as the opening where concrete is cast. Tapping with a rubber mallet provides agitation during the casting process for concrete to flow between the two layers of the tethered knit formwork.

The knitted formwork may either stay-in-place or be removed. Demolding process varies between knit type for the formwork, geometries of the component, and the amount of concrete that encases the formwork from fresh concrete seepage during the casting process. The demolding process includes hand cutting the formwork from the frame, then ripping the formwork off the cured concrete components, and depending on the amount of seepage of concrete on the formwork's surface, may be power-washed to remove encased knit. There is no post-production finishing to the component with only the pour opening to be ground clean.

All the scaffolding material are reused and the knit formwork after casting may be discarded or recycled.

Computational analytical models predictively simulate the form of the final cast component, which is dependent on the relation between the deformations of the knitted formwork and the hydrostatic pressure of the concrete. A series of cylinder prototypes were produced to provide the data on the differential radial displacement with respect to the point along the height of the cylinder. These data were used to formulate and inform variables in the simulation method. The method first computes the internal pressure in the concrete based on the height and radial deformation of the cylinder. The vertical and hoop stresses in the knit are then computed based on these internal pressures. An anisotropic material model is used to model the stress-strain relationships in the knit to account for different elastic behaviors in the two different directions. Finally, the process is rerun iteratively until the model converges to a deformed state where internal and external forces are balanced. This simulation method accounts for several useful variables including the stresses and strains on the knit formwork, anisotropic knit behavior, the self-weight and gravity of the cast, concrete's hydrostatic pressure, and interdependent deformation and loading behavior. Further development of these models will include complex component geometries which will inform knit type and structure for formwork making as well as formal design outcomes for concrete components without extensive physical prototyping.

In order to understand the effects of the knit in relation to the hydrostatic pressure of the concrete, simple cylinders are cast to isolate the behavior of the forces, as shown in FIGS. 9a and 9b, and created computational analytical models to predict the shape. In the analytical models, the height of the cylinder is discretized into half inch segments h, where for each segment the vertical concrete pressure generated during casting $\sigma_v$ is computed. The hoop stress equation is used to compute the horizontal stress in the knit as $\sigma_x = \sigma_h = \sigma_v * r/t$, where r is the radius of the segment, and t is the thickness of the knit, as shown in FIG. 9c. The vertical stress of the knit $\sigma_y$ is found by integrating the weight of concrete supported underneath each segment and dividing by the cross-sectional area of the knit (i.e. the top segment has the largest $\sigma_y$). The matrix in FIG. 9d relates the anisotropic stresses to strains within the fabric. An iterative procedure steps through the deformations, until a converged result is obtained for the shape, as shown in FIG. 9e.

Figure 10C:
FIG. 10c depicts a texture on a casting caused by a multi-material knit formwork in accordance with one example.
Figure 10B:
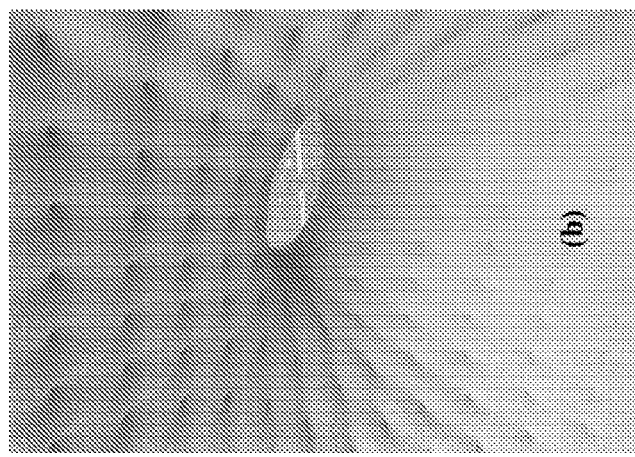
FIG. 10b depicts a tufted texture on a casting in accordance with one example.
Figure 10A:
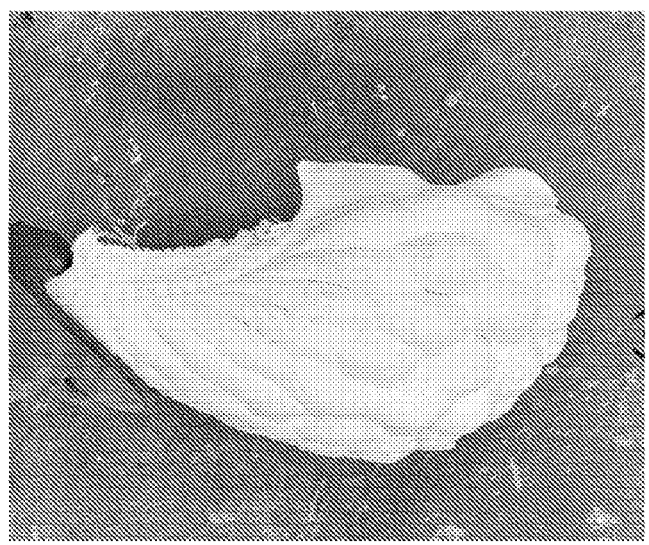
FIG. 10a depicts a varying depth of textures on a casting in accordance with one example.

Formal complexity of local and global effects in the prototypes are unique to each typology. For instance, the degree of constraint on the sides of the knit greatly effects the depth of the surface detail expressed in the cast, as shown in FIG. 10a. More broadly, any single surface knit could include different yarn type and structure for functionally graded performance, with knit surface registered onto the surface of the final cast. For instance, as shown in FIG. 10b, the tether knit created soft 'tufted' effects on the surface of the cast. In FIG. 10c, alternating rows of monofilament and polyester yarn, while designed for strength and stretch, the rows index the complex geometric deformation of the rib knit against the concrete. Casting techniques and demolding processes may call for a balance between the viscosity of the fresh concrete in relation to pouring processes and seepage through the knits as it affects demolding procedures.

A soft knitted formwork enables the knit and a simple frame to be easily transportable and quickly deployed for casting on-site. Large-scale module-based cast may combine separate formworks together before casting or may be cast individually, but in sequence, using mechanical connections embedded in adjacent components (e.g. similar to reinforcement sticking out of the cast in anticipation of the next cast). Monolithic cast may also combine multiple knits together to create inhabitable self-supporting thin- and thick-shell structures. Simulation methods may capture more complex geometries such as diagrid and shell structures.

This approach to casting may be applied toward different aspects of building, from columns to slabs, to load-bearing and non-load bearing panels. Shell structures are also possible using this process. The ease of manufacturing and customized control to designs offers new opportunities for concrete formwork production and construction, especially given the possibility of complex geometries.

Figure 11:
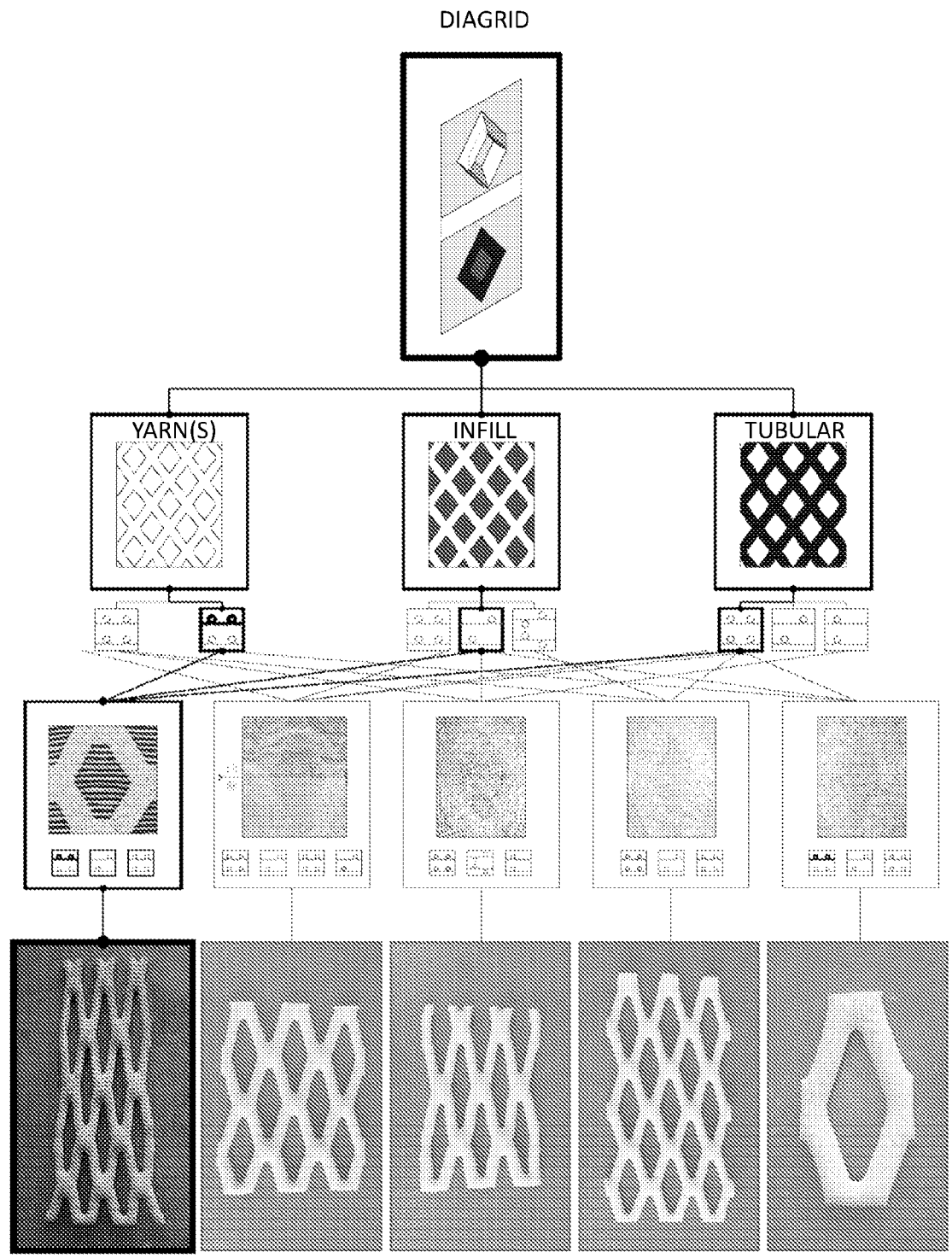
FIG. 11 is a diagram of the different knit features that may be varied within the diagrid typology in accordance with one example.

FIG. 11 is a diagram of the different knit features that may be varied within the diagrid typology. This includes (i) the use of different yarn combinations, (ii) the stitch pattern within the "infill" portion of the diagrid, and (iii) the stitch pattern within the tubular regions of the knit. Different yarn combinations may be applied to the infill and tubular regions to affect elasticity in response to hydrostatic pressure and also manipulate surface texture in the concrete forms. FIG.

11 outlines the different customized control between the scale and appearance of the infill and tubular knit. These combinations, with the yarn type and stitch structure, when filled with concrete, produce varied outcomes.

Figure 12:
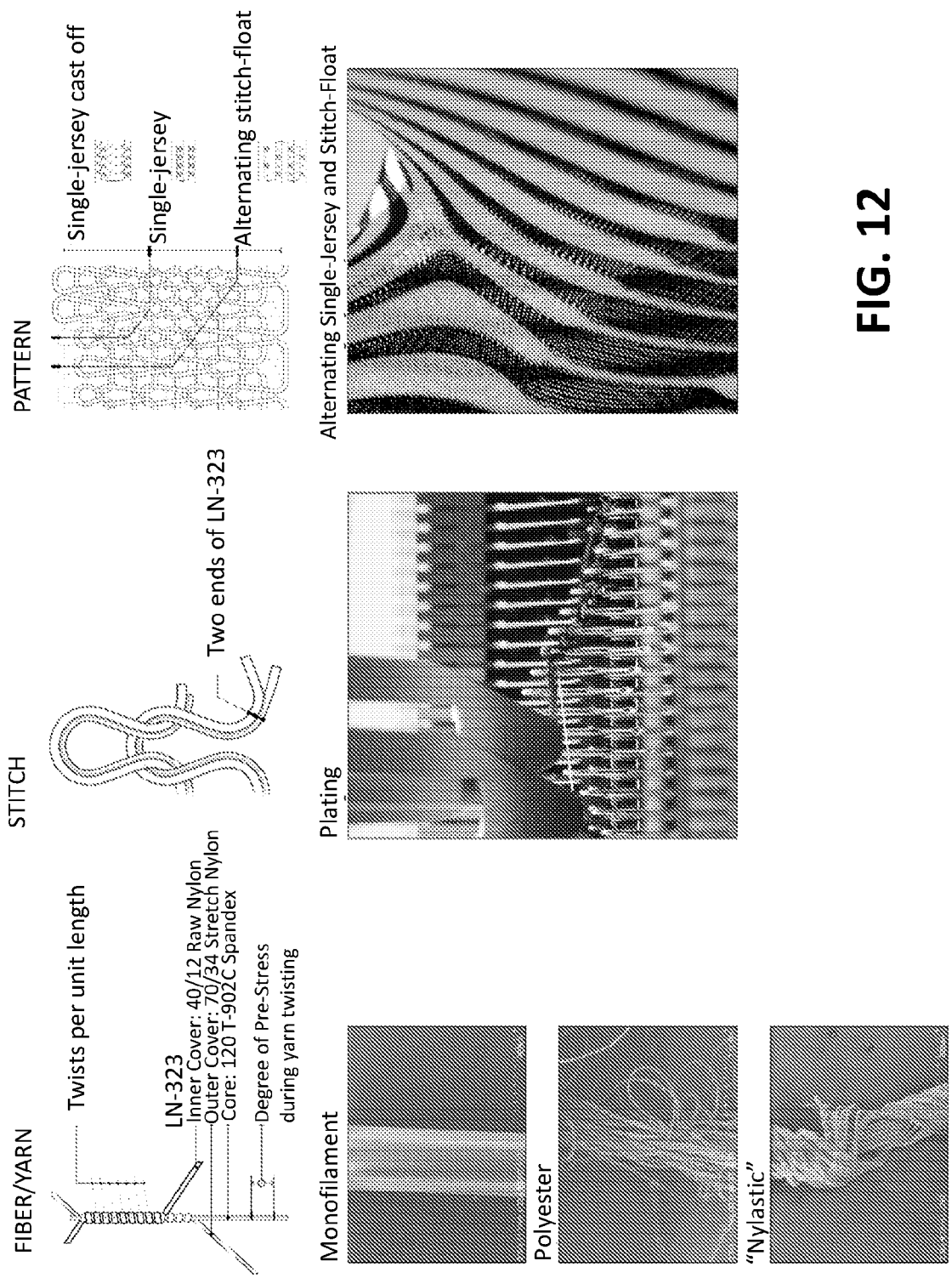
FIG. 12 is a diagram of knit design, including specification of yarn fibers, stitch types, and, knit pattern in accordance with one example.

FIG. 12 is a diagram of the primary manners in which the knitted formwork may be designed—(i) structure of the yarn, (ii) combination of yarns at the stitch level, and (iii) implementation of different stitch patterns within a single knitted textile. The yarn fiber may be made from one or more materials, and made of different twisted or spun constructions. For example, the yarn may be a monofilament of a single material. In another example, the yarn may be made from a polyester fiber having multiple filaments. The multiple filaments help to define bulk as well as structural performance, as shown in the magnified picture. In a further example, the yarn may be made from nylastic, a combination of an elastic core and nylon or polyester wrapper. At the stitch level, two "ends" of yarn are utilized to further enhance the bulk of the knitted textile, controlling the overall porosity as well as structural stiffness. At the pattern level, different patterns, such as a single-jersey in combination with a stitch-tuck pattern, are utilized to created localized regions where stretch in response to hydrostatic pressure is varied.

The knit design may be configured so that multiple yarn fibers may be knitted together and multiple knitting patterns may be used together. For example, two yarns may be knitted along the same pattern. In another example, a knit formwork may include a combination of single jersey, single jersey cast-off, and alternating stitch-float knit patterns. Other combinations of knitting patterns may be used.

Figure 13:
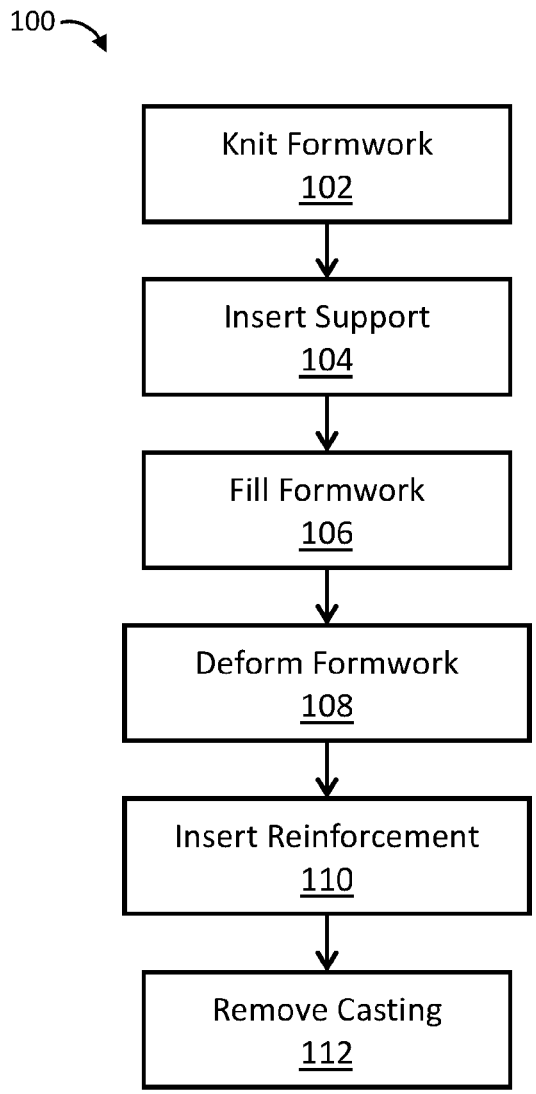
FIG. 13 is a flow diagram of a method of material casting in accordance with one example.

FIG. 13 is a flow diagram of a method 100 of material casting. The method may be performed with, for example, a knit formwork as described in connection with the examples of FIGS. 1-12. The method may produce, for example, a casting as described in connection with the examples of FIGS. 1-12.

In act 102, a formwork is knitted. The formwork may be knitted by a computer controlled knitting machine, such as a CNC knitting machine. The formwork defines a shape for the casting. The shape may be partially closed, for example, a "pouch." The shape of the formwork may have a plurality of topological features. For example, the topological features may include one or more of the knit types (tubular channel, double layer with tethers, aperture) shown in FIGS. 2a-2c.

In act 104, A rigid support is inserted into the formwork. The rigid support may support a side or an opening of the formwork. The rigid support may be separate from the casting reinforcements extending through the casting material deposited in the formwork. In some cases, the rigid support may be inserted into a pocket of the formwork. Examples of rigid supports are shown, for example, in FIGS. 3, 7, and 8.

In act 106, the formwork is filled with the casting material. The casting material may be glass fiber reinforced concrete. In some cases, the formwork may be semi-porous. As a result, some of the casting material may leak or pass through from the inside of the formwork to the outside of the formwork.

In act 108, the formwork is deformed. The weight and hydrostatic pressure of the casting material may deform the formwork. As a result, the shape of the formwork when filled with casting material may be different from a shape of the formwork when empty. However, the shape of the formwork when empty may be chosen or designed to control the deformation. In this way, the initial shape of the formwork may be deformed by the casting material to reach a desired filled shape that is imparted on the casting.

In act 110, a reinforcement member or adjoining mechanical connections are inserted into the formwork, embedded into the concrete. In some cases, the reinforcement member may be inserted prior to filling the formwork with the casting material. The reinforcement may provide internal support to the cast component. Example of reinforcements in a cast are shown inserted into a diagrid in FIGS. 3a and 3b. The reinforcement may extend beyond an outer surface of the cast and, in some cases, outside of the formwork to be use for component-to-component connection.

In act 112, the formwork is removed from the cast. The cast, by being constrained by the formwork, may include a shape and/or texture of the formwork. In some cases, for example where there are apertures or infill in the formwork, the formwork may need to be removed from the cast in parts. For example, the formwork may be cut off of the cast. In some other cases, the formwork may be reused for further casting or recycled.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A method of material casting, the method comprising:
   knitting, by a computer-controlled knitting machine, a flexible formwork, wherein the flexible formwork defines a partially-closed shape having a plurality of topological features;
   filling the partially-closed shape of the flexible formwork with a casting material; and
   allowing the casting material to move to deform the flexible formwork to deform as the casting material fills the partially-closed shape and stretches the flexible formwork due to weight of the casting material, hydrostatic pressure of the casting material, or both the weight of the casting material and the hydrostatic pressure of the casting material.

2. The method of claim 1, wherein a topological feature of the plurality of topological features includes a pocket.

3. The method of claim 1, wherein a topological feature of the plurality of topological features includes a tether between surfaces of the flexible formwork.

4. The method of claim 1, wherein a topological feature of the plurality of topological features includes an aperture.

5. The method of claim 1, further comprising inserting a casting reinforcement member into the flexible formwork before filling the flexible formwork.

6. The method of claim 1, wherein the flexible formwork has a first conformation and a second conformation different from the first conformation;
   wherein the flexible formwork in the second conformation defines the partially-closed shape of the flexible formwork; and
   wherein filling the flexible formwork with the casting material deforms the flexible formwork from the first conformation to the second conformation.

7. The method of claim 6, further comprising determining the first conformation of the flexible formwork based on the partially-closed shape of the flexible formwork and a texture of the second conformation prior to filling the flexible formwork with the casting material.

8. The method of claim 7, wherein determining the first conformation of the flexible formwork is based on a physical property of the casting material.

9. The method of claim 8, wherein the physical property is a rheological property.

10. The method of claim 1, wherein the flexible formwork comprises a pocket for a rigid support separate from the casting material.

11. The method of claim 10, further comprising inserting the rigid support into the pocket.

12. The method of claim 1, wherein the flexible formwork is knitted from a plurality of yarns,
wherein a first yarn of the plurality of yarns is composed of polyester, nylon, spandex, or a combination thereof, and
wherein a second yarn of the plurality of yarns is composed of polyester, nylon, spandex, or a combination thereof, different from the first yarn.

13. The method of claim 12, wherein the flexible formwork includes a wall and a tether,
wherein the wall comprises the first yarn, and
wherein the tether comprises the second yarn.

14. The method of claim 1, wherein the casting material is glass fiber reinforced concrete (GFRC).

15. The method of claim 1, further comprising removing the casting material from the flexible formwork after allowing the casting material to move to deform the flexible formwork.

16. The method of claim 1, wherein the flexible formwork defines a texture.

17. The method of claim 1, wherein knitting the flexible formwork comprises integrating multiple yarn types to form the flexible formwork.

18. The method of claim 17, wherein knitting the flexible formwork comprises using multiple knitting patterns.

19. The method of claim 1, wherein filling the partially-closed shape comprises pouring the casting material into a pouch of the partially-closed shape.

20. The method of claim 1, wherein allowing the casting material to move to deform and stretch the flexible formwork is implemented while the flexible formwork is not stiffened with a stiffening agent.

* * * * *